United States Patent
Bhaskar et al.

(10) Patent No.: US 9,075,453 B2
(45) Date of Patent: Jul. 7, 2015

(54) HUMAN EYE CONTROLLED COMPUTER MOUSE INTERFACE

(75) Inventors: Harish Bhaskar, Abu Dhabi (AE); Youssef Iraqi, Abu Dhabi (AE); Sultan Al Sharif, Abu Dhabi (AE)

(73) Assignee: KHALIFA UNIVERSITY OF SCIENCE, TECHNOLOGY & RESEARCH (KUSTAR), Abu Dhabi (AE)

( * ) Notice: Subject to any disclaimer, the term of this patent is extended or adjusted under 35 U.S.C. 154(b) by 453 days.

(21) Appl. No.: 13/339,395

(22) Filed: Dec. 29, 2011

(65) Prior Publication Data

US 2013/0169530 A1 Jul. 4, 2013

(51) Int. Cl.
G06F 3/033 (2013.01)
G06F 3/01 (2006.01)

(52) U.S. Cl.
CPC .............. *G06F 3/033* (2013.01); *G06F 3/012* (2013.01); *G06F 3/013* (2013.01)

(58) Field of Classification Search
None
See application file for complete search history.

(56) References Cited

U.S. PATENT DOCUMENTS

| | | | | |
|---|---|---|---|---|
| 5,481,622 A * | 1/1996 | Gerhardt et al. | .............. | 382/103 |
| 5,878,156 A * | 3/1999 | Okumura | ...................... | 382/118 |
| 7,751,599 B2 * | 7/2010 | Chen et al. | ..................... | 382/118 |
| 2003/0142068 A1 * | 7/2003 | DeLuca et al. | ................. | 345/156 |
| 2005/0199783 A1 * | 9/2005 | Wenstrand et al. | ........ | 250/214.1 |
| 2008/0266257 A1 * | 10/2008 | Chiang | ......................... | 345/163 |
| 2011/0228975 A1 * | 9/2011 | Hennessey et al. | ........... | 382/103 |
| 2012/0113135 A1 * | 5/2012 | Sakai et al. | ..................... | 345/619 |
| 2012/0295708 A1 * | 11/2012 | Hernandez-Abrego et al. | ................... | 463/36 |
| 2013/0002551 A1 * | 1/2013 | Imoto et al. | .................... | 345/158 |
| 2013/0070046 A1 * | 3/2013 | Wolf et al. | ................. | 348/14.16 |
| 2013/0083976 A1 * | 4/2013 | Ragland | ........................ | 382/117 |

OTHER PUBLICATIONS

C.H. Morimoto, et al., "Pupil Detection and Tracking Using Multiple Light Sources", Image and Vision Computing, 18 (2000).
Paul Viola and Michael Jones, "Fast and Robust Classification using Asymmetric AdaBoost and a Detector Cascade," in Proc. of NIPSO1 (2001).
Philip A. Tresadern, et al., "Combining Local and Global Shape Models for Deformable Object Matching," In BMVC (2009).
Matthew Harker et al., "Direct and Specific Fitting of Conics to Scattered Data", in BMVC (2004).

* cited by examiner

*Primary Examiner* — Kent Chang
*Assistant Examiner* — Andrew Lee
(74) *Attorney, Agent, or Firm* — Renner, Otto, Boisselle & Sklar, LLP

(57) ABSTRACT

A system, method, and device are provided that receive an image sequence from a camera, processes the image sequence, extract gaze information, map the user's eye movements to movement of the mouse cursor, and initiates mouse clicks based on user behavior.

24 Claims, 6 Drawing Sheets

HUMAN EYE CONTROLLED COMPUTER MOUSE INTERFACE

TECHNICAL FIELD OF THE INVENTION

The technology of the present disclosure relates generally to a system, method, and device for a human eye controlled computer mouse interface, and more particularly to a system and method for controlling a mouse cursor and mouse clicks utilizing face and eye detection without physical movement of the mouse.

BACKGROUND

A computer mouse is typically used as a pointing device to move a cursor on a computer display to select, move, or manipulate objects using mouse clicks. The computer mouse has been through a variety of technological advancements, such as physical changes, modifications and enhancements in the features, etc. However, it has remained difficult for physically disabled people to use a computer mouse. Recent advancements have attempted to solve this problem with limited success due to high cost, low efficiency, unreliability, health risks, inability to handle small movements of the pupil or changes in the target's position, the need for special hardware, and other issues.

This disclosure provides a means to aid individuals with physical disabilities and all common users in using a computer. A system is provided that enables controlling a mouse cursor using the human eye without the use of additional sophisticated hardware.

SUMMARY

A system, method, and device are provided that receive an image sequence from a camera, processes the image sequence, extract gaze information, map the user's eye movements to movement of the mouse cursor, and initiates mouse clicks based on user behavior.

According to one embodiment of the present invention, there is provided a computer device comprising an eye-controlled computer mouse interface system, the computer device comprising:
  a camera or multiple cameras; a display; a memory;
  a processor programmed to execute a program comprising the eye-controlled computer mouse interface system, wherein the eye-controlled computer mouse interface system comprises a data acquisition function, a calibration function, an eye detection function, a face detection function, and a gaze mapping function;
  wherein the data acquisition function is configured to:
    acquire data in the form of at least one of individual images, stored video, live streaming video, or live streaming video from multiple cameras, wherein the acquired data is stored as a sequence of images, and individual images in the sequence of images are referred to as frames; and
    set a current frame in the image sequence, wherein a first frame in the image sequence is set as the current image;
  wherein the calibration function is configured to:
    determine ratio values used to map movement of a user's eyes to the corresponding movement of a mouse cursor on the display; and store the ratio values in the memory;
  wherein the face detection function is configured to:
    detect a face in each frame of the sequence of images; extract the detected face; store the extracted frame in the memory; and end processing of the current frame if the user's face is not detected;
  wherein the eye detection function is configured to:
    retrieve the extracted face; localize and extract an eye region encompassing both of the user's eyes from the extracted face; split the eye region into a right eye region and a left eye region; determine for each eye region an eye center and a pupil center; store the eye center and pupil center for each eye region in the memory; and
    detect a left eye wink, a right eye wink, or a blink, wherein the left eye wink is a closing of the left eye while the right eye remains open, the right eye wink is a closing of the right eye while the left eye remains open, and the blink is a closing of both the left eye and right eye;
  wherein the gaze mapping function is configured to:
    map movement of the user's eyes to movement of the mouse cursor on the display using the eye center and pupil center for each eye region retrieved from the memory and the ratio values retrieved from the memory;
    perform a left mouse click when the left eye wink has been detected for a number of frames greater than or equal to a wink threshold; perform a right mouse click when the right eye wink has been detected for a number of frames greater than or equal to the wink threshold; and perform a double left mouse click when the blink has been detected for a number of frames greater than or equal to a blink threshold.

According to one embodiment, the calibration function is further configured to: display a target in a range of selected positions on the display, wherein the user follows the target on the display; initiate the eye detection function to determine the pupil center and eye center for each target position; determine the ratio values using the pupil center, eye center, and target position for each of the target positions; and store the ratio values for the user in the memory.

According to one embodiment, the gaze mapping function further configured to: utilize a four or eight direction algorithm to map movement of the user's eyes to movement of the mouse cursor on the display.

According to one embodiment, the calibration function is further configured to: determine if the user is a new user or if the ratio values were previously determined for the user and stored in the memory; and retrieve the ratio values if the ratio values were previously determined for the user and stored in the memory or determine the ratio values for the new user.

According to one embodiment, the eye detection function further comprising tracking eye regions in the current frame when the eye regions were detected in the previous frame, wherein tracking comprises predicting the location of the eye in the current frame using the eye center in the previous frame.

According to one embodiment, the eye detection function uses a point distribution model of the face.

According to one embodiment, the eye detection function detects a blink or wink by fitting a straight line to corners of the eye and top and bottom of the eyelids as determined by the point distribution model of the face, wherein the wink or blink is detected if the line has an error less than an error threshold.

According to one embodiment, the gaze mapping function is further configured to map movement of the mouse cursor based on the location of one eye and correct the mapping using the corresponding localization of the second eye.

According to one embodiment, the right eye region and left eye region are used to perform a distance measurement of a user from the display and to compensate for movement of the user's head.

According to one embodiment, the eye detection function localizes the eye by fitting an elliptical curve to the eye region.

According to one embodiment, the system is further configured to continuously track the gaze of the user using live stream data.

According to one embodiment, a sleep instruction is sent to the device if a blink is detected for a number of frames greater than or equal to a sleep threshold.

According to one embodiment, the resolution of the device camera is 1.3 megapixels or greater.

According to another embodiment of the present invention, there is provided a method for controlling an eye-controlled computer mouse interface, the method comprising:

acquiring data in the form of at least one of individual images, stored video, live streaming video, or live streaming video from multiple cameras, wherein the acquired data is stored as a sequence of images, and individual images in the sequence of images are referred to as frames;

setting a current frame in the image sequence, wherein a first frame in the image sequence is set as the current image; determining ratio values used to map movement of a user's eyes to the corresponding movement of a mouse cursor on a display;

storing the ratio values; detecting a face in each frame of the sequence of images; extracting the detected face; storing the extracted frame; ending processing of the current frame if the user's face is not detected; retrieving the extracted face;

localizing and extracting an eye region encompassing both of the user's eyes from the extracted face; splitting the eye region into a right eye region and a left eye region; determining for each eye region an eye center and a pupil center;

storing the eye center and pupil center for each eye region;

detecting a left eye wink, a right eye wink, or a blink, wherein the left eye wink is a closing of the left eye while the right eye remains open, the right eye wink is a closing of the right eye while the left eye remains open, and the blink is a closing of both the left eye and right eye;

mapping movement of the user's eyes to movement of the mouse cursor on the display using the retrieved eye center and pupil center for each eye region and the retrieved ratio values;

performing a left mouse click when the left eye wink has been detected for a number of frames greater than or equal to a wink threshold; performing a right mouse click when the right eye wink has been detected for a number of frames greater than or equal to the wink threshold; and performing a double left mouse click when the blink has been detected for a number of frames greater than or equal to a blink threshold.

According to one embodiment, the method further comprises: displaying a target in a range of selected positions on the display, wherein the user follows the target on the display; determining the pupil center and eye center for each target position; determining the ratio values using the pupil center, eye center, and target position for each of the target positions; and storing the ratio values.

According to one embodiment, the method further comprises: utilizing a four or eight direction algorithm to map movement of the user's eyes to movement of the mouse cursor on the display.

According to one embodiment, the method further comprises: determining if the user is a new user or if the ratio values were previously determined for the user and stored; and retrieving the ratio values if the ratio values were previously determined for the user and stored or determine the ratio values for the new user.

According to one embodiment, the method further comprises: tracking eye regions in the current frame when the eye regions were detected in the previous frame, wherein tracking comprises predicting the location of the eye in the current frame using the eye center in the previous frame.

According to one embodiment, the eye region localization is performed using a point distribution model of the face.

According to one embodiment, the method detects a blink or wink by fitting a straight line to corners of the eye and top and bottom of the eyelids as determined by the point distribution model of the face, wherein the wink or blink is detected if the line has an error less than an error threshold.

According to one embodiment, the method is further configured to map movement of the mouse cursor based on the location of one eye and correct the mapping using the corresponding localization of the second eye.

According to one embodiment, the right eye region and left eye region are used to perform a distance measurement of a user from the display and to compensate for movement of the user's head.

According to one embodiment, the method localizes the eye by fitting an elliptical curve to the eye region.

According to one embodiment, the method is further configured to continuously track the gaze of the user using live stream data.

According to one embodiment, the method further comprises sending a sleep instruction if a blink is detected for a number of frames greater than or equal to a sleep threshold.

BRIEF DESCRIPTION OF THE DRAWINGS

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
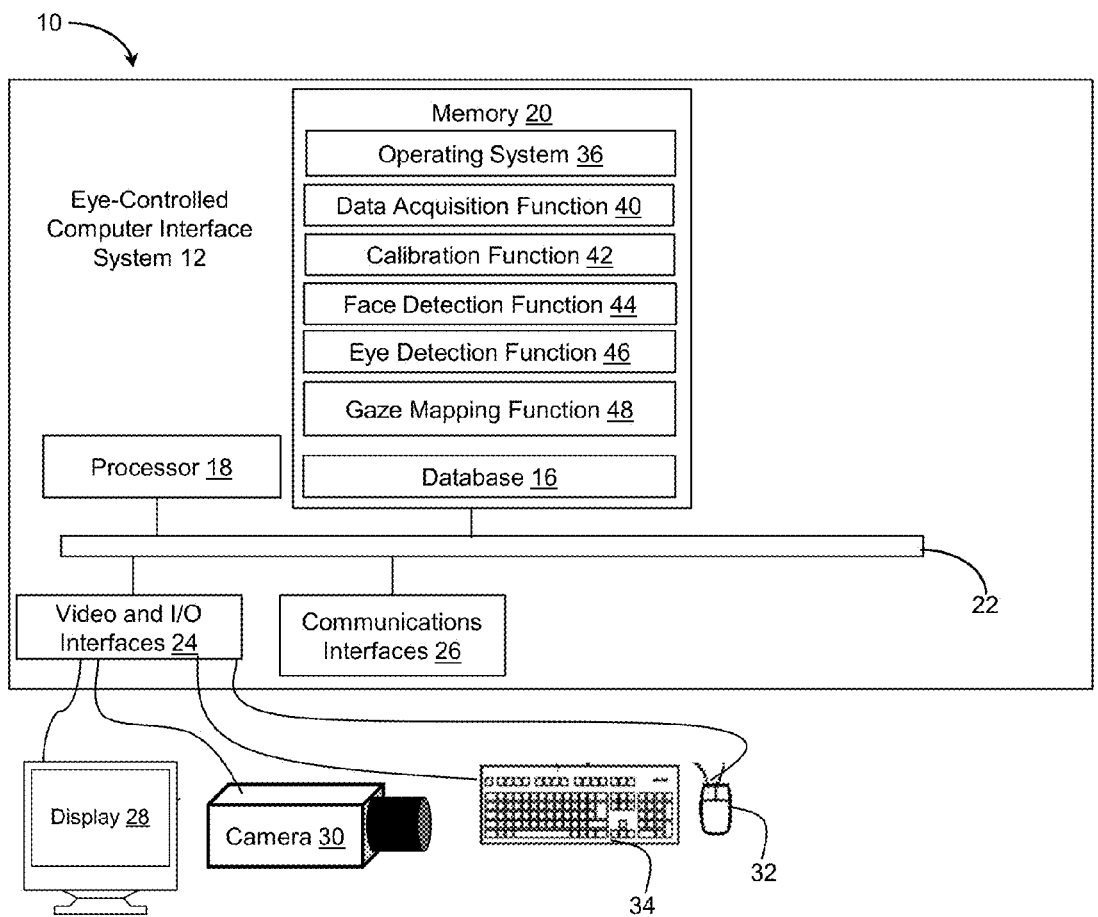
FIG. 1 is a schematic view of an exemplary system for controlling mouse cursor movement and clicks utilizing face and eye detection without physical movement of the mouse.

Embodiments will now be described with reference to the drawings, wherein like reference numerals are used to refer to like elements throughout. It will be understood that the figures are not necessarily to scale.

With reference to FIG. 1, illustrated is a schematic block diagram of a computer device 10. The computer device 10 may comprise a desktop computer, a laptop computer, a tablet computer, a smart phone, a digital video recorder (DVR), a television, a DVD player, or other similar device. The computer device 10 includes an eye-controlled computer interface system 12 that is implemented using computer technology. The eye-controlled computer interface system 12 is configured to execute a data acquisition function 40, a calibration function 42, a face detection function 44, an eye detection function 46, a gaze mapping function 48, and to store a database 16.

In one embodiment, the data acquisition function 40, calibration function 42, face detection function 44, eye detection function 46, and gaze mapping function 48 are embodied as one or more computer programs (e.g., one or more software applications including compilations of executable code). The computer program(s) and/or database 16 may be stored on a machine readable medium, such as a magnetic, optical or electronic storage device (e.g., hard disk, optical disk, flash memory, etc.).

To execute the data acquisition function 40, calibration function 42, face detection function 44, eye detection function 46, and gaze mapping function 48, the eye-controlled computer interface system 12 includes one or more processors 18 used to execute instructions that carryout a specified logic routine(s). In addition, the eye-controlled computer interface system 12 has a memory 20 for storing data, logic routine instructions, files, operating system instructions, and the like. As illustrated, the calibration function 42, data acquisition function 40, face detection function 44, eye detection function 46, gaze mapping function 48, and database 16 may be stored by the memory 20. The memory 20 may comprise several devices, including volatile and non-volatile memory components. Accordingly, the memory 20 may include, for example, random access memory (RAM), read-only memory (ROM), flash devices and/or other memory components. The processor 18 and the components of the memory 20 may be coupled using a local interface 22. The local interface 22 may be, for example, a data bus with accompanying control bus or other subsystem.

The eye-controlled computer interface system 12 may have various video and input/output (I/O) interfaces 24. The video and I/O interfaces 24 may be used to couple the device to a display 28, camera 30, mouse 32, and/or keyboard 34. The display 28 may be a computer monitor, television screen, mobile phone display, or other suitable display. The camera 30 may be a webcam, video camera, digital camera, network camera, high definition (HD) camera, security camera, wireless camera, camera integrated into the computer device 10, series of multiple cameras, or other suitable camera. The camera 30 may have a resolution of at least 1.3 megapixels.

The eye-controlled computer interface system 12 may have one or more communications interfaces 26. The communications interfaces 26 may include, for example, a Bluetooth module, a Zigbee module, a wireless USB module, a USB connector, a mini-USB connector, a firewire IEEE 1394 connector, micro-USB connector, and/or other standard or non-standard/proprietary protocols.

With reference to FIGS. 2A-2F, illustrated are logical operations to implement exemplary methods of controlling mouse cursor movement and mouse clicks utilizing face and eye detection without physical movement of the mouse. Executing an embodiment of the eye-controlled computer interface system 12, for example, may include carrying out the following exemplary methods. Thus, the flow diagram may be thought of as depicting steps of one or more methods carried out by the eye-controlled computer interface system 12. Although the flow charts show specific orders of executing functional logic blocks, the order of executing the blocks may be changed relative to the order shown, as will be understood by the skilled person. Also, two or more blocks shown in succession may be executed concurrently or with partial concurrence.

Figure 2A:
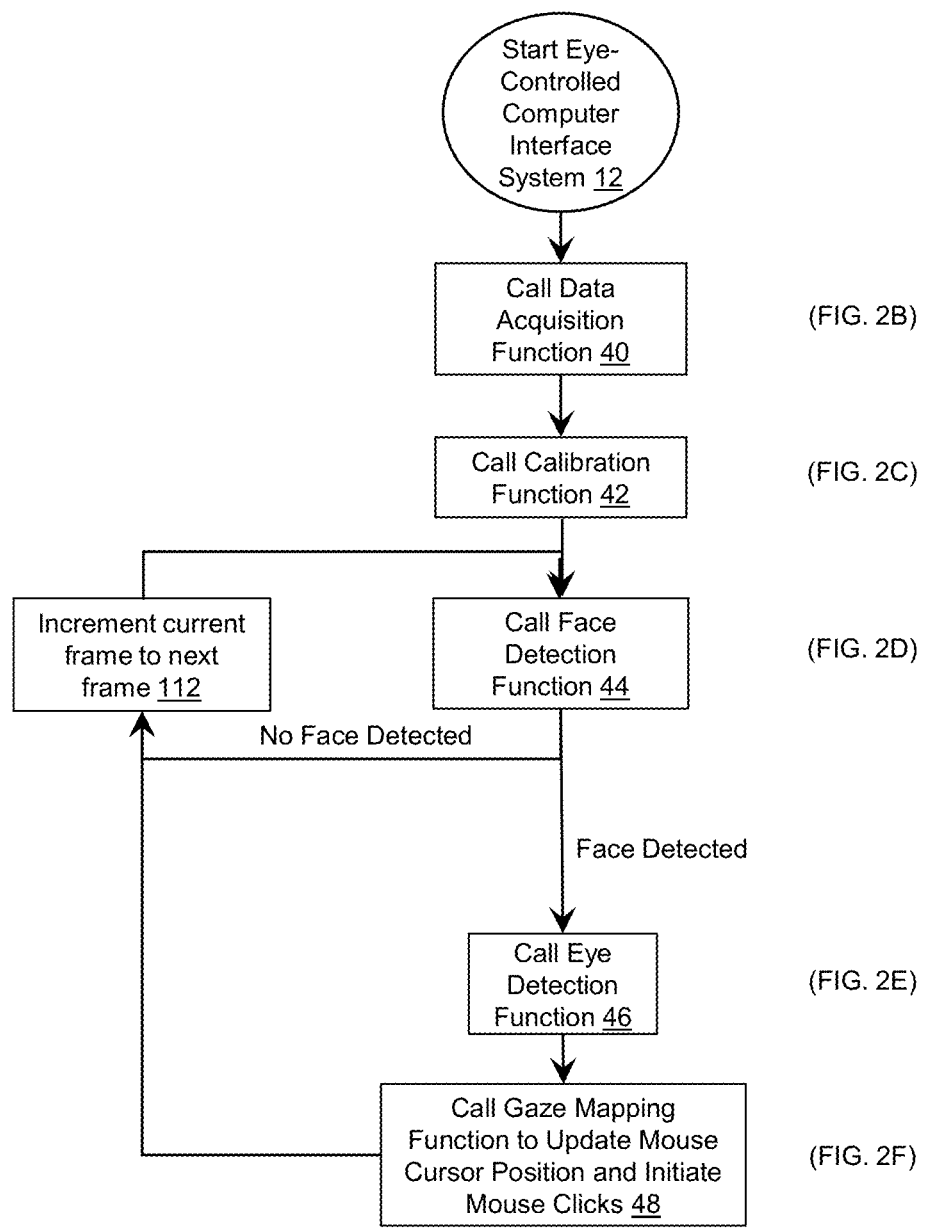
FIGS. 2A-2F are flow diagrams representing exemplary actions taken by various components of the system of FIG. 1.

With continued reference to FIG. 2A, the eye-controlled computer interface system 12 calls the data acquisition function 40, calibration function 42, and face detection function 44. The eye-controlled computer interface system 12 calls the eye detection function 46 and gaze mapping function 48 if a face is detected by the face detection function 44 in step 162. If a face is not detected by the face detection function then the eye-controlled computer interface system 12 ends processing of the current frame and begin processing the next frame in the image sequence.

Figure 2B:
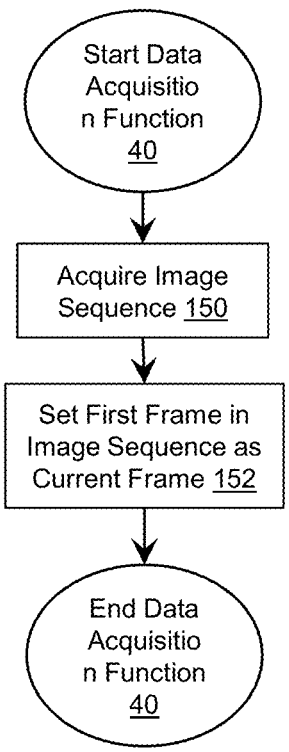

With reference to FIGS. 2A and 2B, the data acquisition function 40 receives a sequence of images 150, wherein the individual images in the sequence of images may be designated as frames. The data acquisition function 40 sets the first frame in the image sequence as the current frame in step 152. The sequence of images may be in the form of individual images, stored video data, live streaming video data, live streaming video data from a series of cameras, or data in other suitable form. The image sequence may comprise images captured by the camera 30 or images stored in the database 16. The data acquisition function 40 receives live streaming video data from the camera 30 when the eye-controlled computer interface system 12 is used to control a mouse cursor in real time.

Figure 2C:
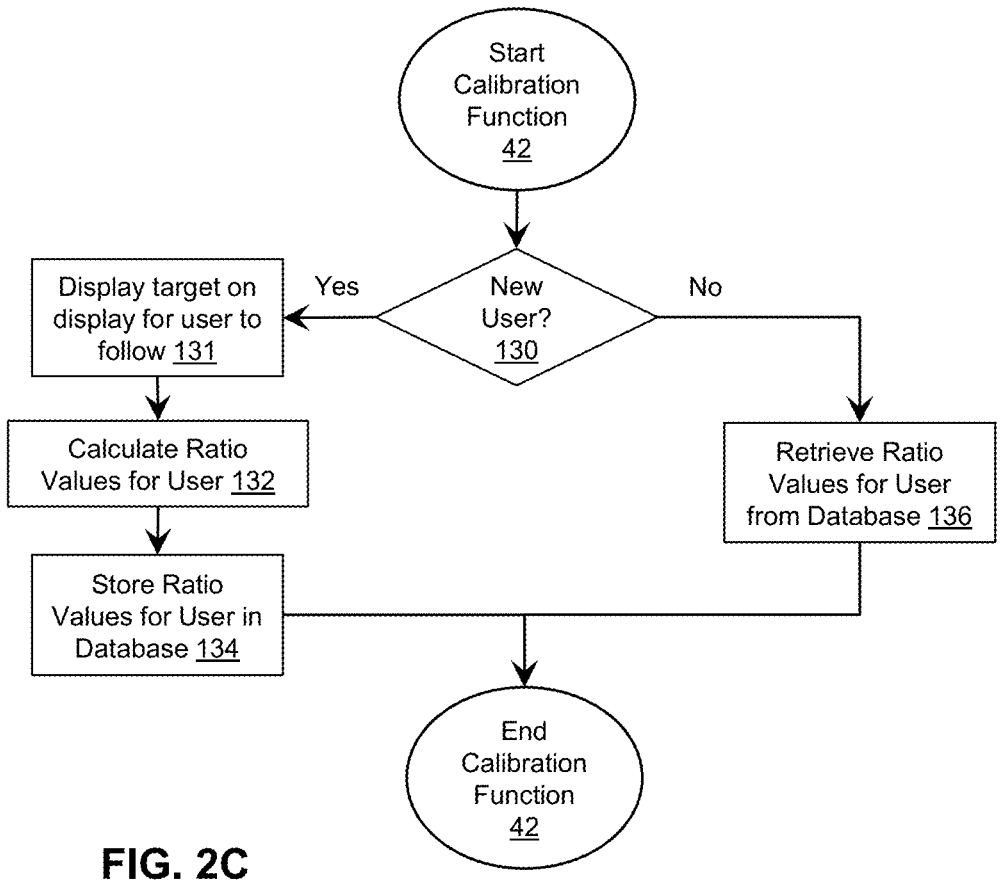

With reference to FIGS. 2A and 2C, the calibration function 42 determines the parameters necessary to map movement of a user's eyes to the corresponding movement of the cursor on the display 28. The parameters may comprise ratio values $r_x$ and $r_y$. The calibration function 42 performs calibration for each user, because mapping the movement of a user's eyes to movement of a cursor on the display 28 is user dependent. In step 130, the calibration function 42 determines if the user of the computer device 10 is a new user. The calibration function 42 may determine if a user is a new user by performing face recognition, prompting a user for identification, by assuming the current user is the same user who last used the computer device 10, or any other suitable method.

If the current user is determined to be a previous user, the ratio values for the user are retrieved from the database in step 136. If the current user is determined to be a new user in step 130, a target is displayed across a range of selected positions on the display for the user to follow in step 131. The ratios $r_x$ and $r_y$ are calculated from the data collected as the user follows the movement of the target on the display 28 in step 132.

For example, the ratios used to map the movement of the eye to the size of the display may be estimated using the following equations:

$$r_x = \frac{x_{ec} - x_e}{x_{sc} - x_s}$$
$$r_y = \frac{y_{ec} - y_e}{y_{sc} - y_s}$$

where $x_s$ and $y_s$ are, respectively, the x-axis and y-axis location of the cursor on the display; $x_{sc}$ and $y_{sc}$ are, respectively, the center of the display 28 in the x-direction and y-direction; $x_{ec}$ and $y_{ec}$ are, respectively, the eye center in the x-direction and y-direction; and $x_e$ and $y_e$ are, respectively, the location of the pupil center in the x-direction and y-direction.

The position of the target ($x_s$ and $y_s$) during calibration and the center of the display ($x_{sc}$ and $y_{sc}$) are known. The eye center ($x_{ec}$ and $y_{ec}$) and pupil center ($x_e$ and $y_e$) are measured by the eye-controlled computer interface system 12 as described below. Using these values, the ratios $r_x$ and $r_y$ mapping movement of the eye(s) to the size of the display in the x-direction and y-direction respectively can be determined.

After determining the ratio values in step 132, the ratio values for the user may be stored in the database or memory in step 134.

Figure 2D:
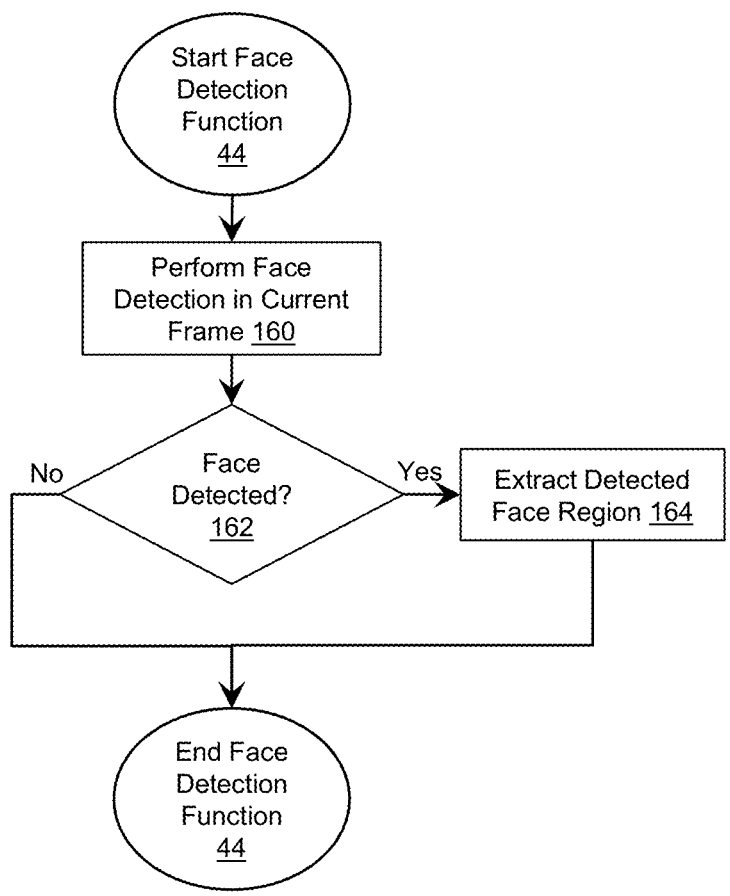

With reference to FIGS. 2A and 2D, the face detection function 44 is initiated following step 42. The face detection function 44 performs face detection on the current frame in step 160. The face detection function 44 may use the Viola-Jones method, Neural Network-based method, statistical based method, shape based method, example based learning method, wavelet based method, Probabilistic Modeling of Local Appearance methods, Spatial Relationships based methods, or any other suitable method for face detection. If a face is detected, the face detection function 44 extracts the user's face from the current frame and stores the extracted face in the memory 20 or database 16.

If a face is not detected in the current frame in step 162, processing of the current frame ends and the current frame is incremented to the next frame in the image sequence in step 112. Conversely, if a face is detected in the current frame in step 162, the detected face region is extracted in step 164 by the face detection function 44 and the eye detection function 46 is initialized.

Figure 2E:
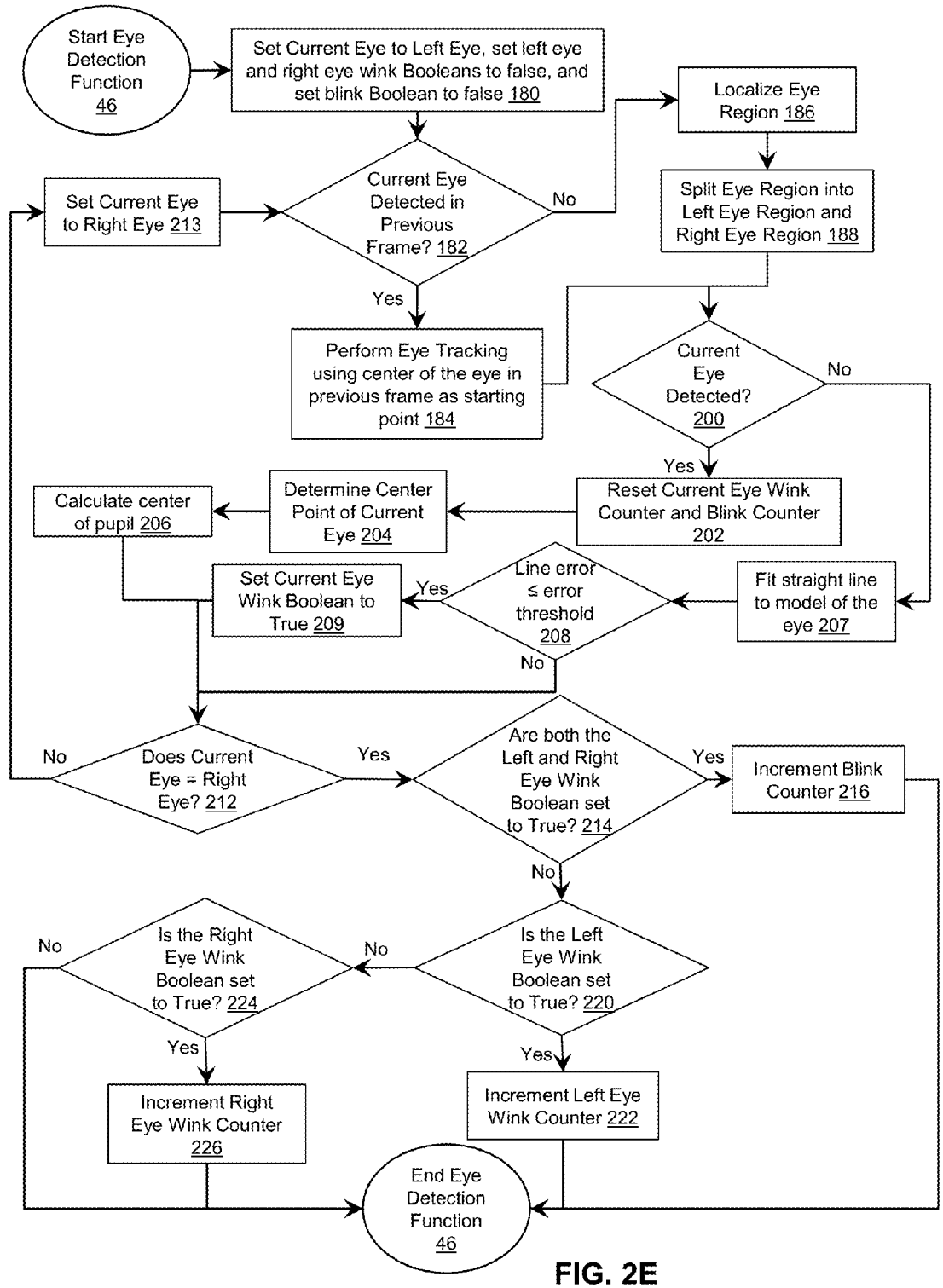
Figure 2F:
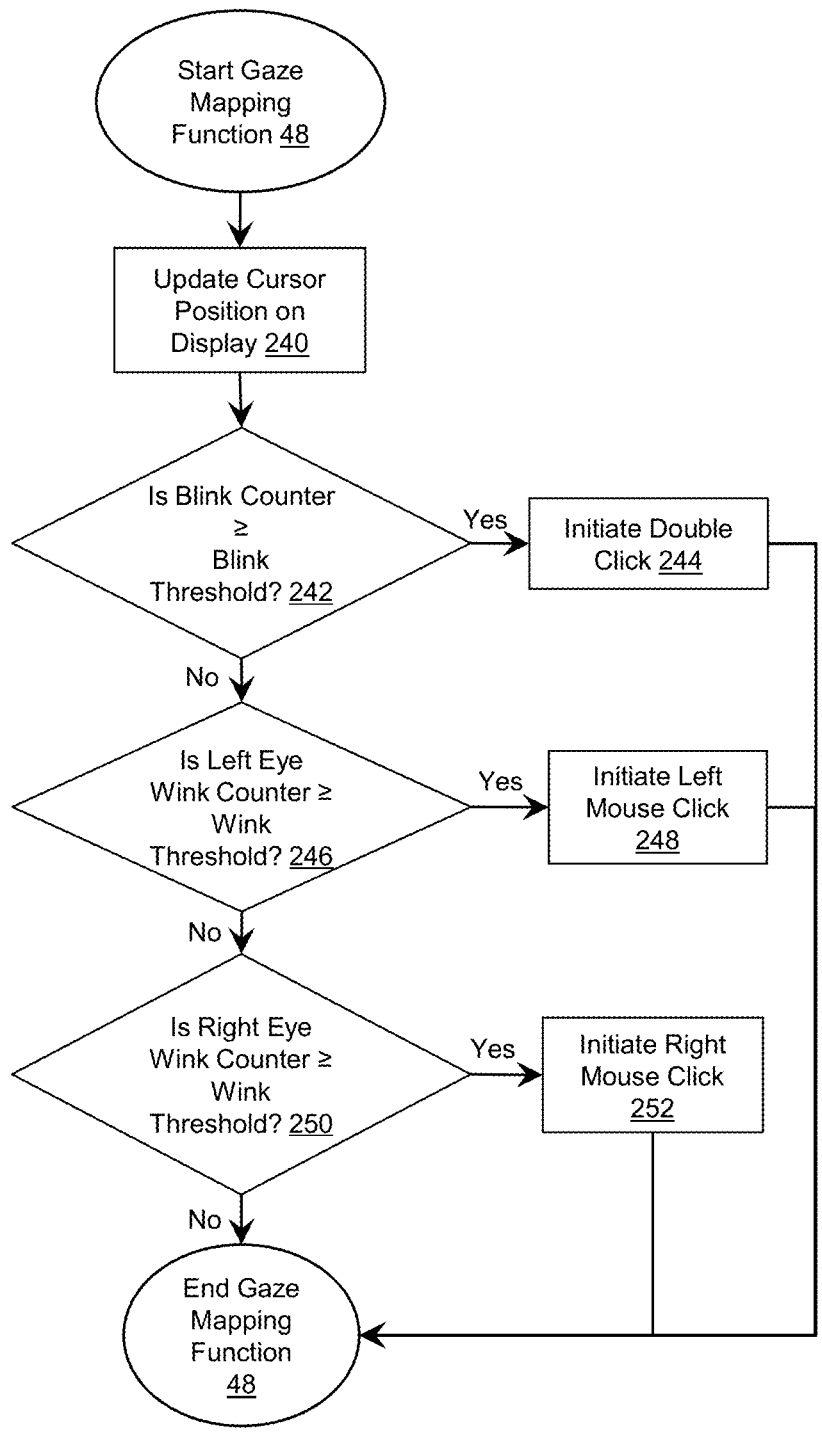

With reference to FIGS. 2A and 2E, the eye detection function 46 detects winks and blinking to initiate mouse clicks. A wink is a closing of either the left or right eye. A blink is a closing of both eyes.

In step 180, the eye detection function 46 sets the current eye as the left eye, retrieves the extracted face from the memory or database, and resets the left eye wink Boolean, right eye wink Boolean, and blink Boolean to false. Next, the eye detection function 46 may check if the current eye was detected in the previous frame of the image sequence in step 182. If the current eye was detected in the previous frame, eye tracking may be performed on the extracted face region from the face detection function 44 in step 184. Eye tracking tracks movement of the current eye between frames by predicting movement of the eye to a specific region. Eye tracking in step 186 may be performed using a color based particle filter or other suitable means. Eye tracking may begin at an initial point, wherein the initial point is the eye center localized in the previous step.

If the current eye was not detected in the previous frame of the image sequence in step 182, the eye detection function 46 localizes the eye region in step 186. The eye region includes both the left and right eyes. The eye detection function 46 may use a model based eye detection framework, Hierarchical wavelet network based methods, Neural-network based methods, statistical based method, shape based method, Spatial Relationships based methods, or other suitable method to localize the eye region. The right and left eyes may be localized by fitting an elliptical curve to the eye region. The estimates of the fit ellipse routine can be correlated with the shape distribution of the eye if known.

Following localization of the eye region in step 186, the eye detection function 46 splits the eye region to extract both the right eye region and left eye region in step 188. If the current eye is detected in the previous steps in step 200, the blink counter and the wink counter for the current eye is reset to zero in step 202. The blink counter and current eye wink counter are reset to zero, because the eye was detected and not closed during a wink or blink. Following step 202, the current eye center is calculated in step 204. Next, in step 206 the pupil center is calculated. The pupil may be detected using model based detection, color based detection, or other suitable detection methods. The pupil center and eye center for the user may be stored in the database or memory.

If the current eye is not detected in step 200, the current eye wink Boolean is set to true in step 209. The eye detection function 46 may also perform blink/wink detection using a point distribution model of the eye region. The eye detection function 46 may utilize a shape model or other suitable means to detect the corners of the current eye and top/bottom of the eye lids. The eye detection function 46 may attempt to fit a straight line to these points in step 207. The current eye blink Booleans may be set to true in step 209 if the eye detection function 46 finds a straight line fit with an error less than an error threshold in step 208.

In step 212, the current eye is checked to determine if the current eye is set to be the right eye. Both eyes have been analyzed if the current eye is set to be the right eye, because the left eye is analyzed before the right eye. Therefore, the right eye has not been analyzed if the current eye is set to be the left eye. In step 213, the current eye is set to be the right eye and the previous steps are repeated if the current eye is set to be the left eye.

If the current eye is set to be the right eye in step 212, the value of the left eye wink Boolean and right eye wink Boolean are checked. If the left and right eye wink Boolean values are both set to true in step 214, then a blink has been detected and the blink counter is incremented by one in step 216 and the eye-controlled computer interface system 12 exits the eye detection function 46.

If either of the left eye or right eye wink Boolean is set to false 214, the value of the left eye wink Booleans is checked 220. If the left eye wink Boolean is set to true, the left eye wink counter 222 is incremented by one and the eye-controlled computer interface system 12 exits the eye detection function 46.

If the left eye wink Booleans is set to false in step 220, the value of the right eye wink Booleans is checked in step 224. If the right eye wink Boolean is set to true in step 224, the right eye blink counter is incremented by one in step 226 and the eye-controlled computer interface system 12 exits the eye detection function 46. If the right eye wink Boolean is set to false, the eye-controlled computer interface system 12 exits the eye detection function 46.

Following the eye detection function 46, the gaze mapping function 48 is initialized. The gaze mapping function 48 maps movement of the user's eyes to movement of the cursor on the display in step 240. A four or eight direction algorithm may be used to map movement of the user's eyes to movement of the mouse cursor on the display. For example, movement of the mouse cursor can be correlated to movement of the user's eyes based on the following equations:

$$x_s = x_{sc}((x_{ec}-x_e)*r_x)$$

$$y_s = y_{sc}((y_{ec}-y_e)*r_y)$$

The ratios ($r_x$ and $r_y$) are estimated as described above and retrieved from the memory or the database, the display center ($x_{sc}$ and $y_{sc}$) is known, and the eye center ($x_{ec}$ and $y_{ec}$) and location of the pupil center ($x_e$ and $y_e$) are measured by the eye-controlled computer interface system 12 as described above and retrieved from the memory or the database. The location of the mouse cursor on the display 28 is updated using this information and the above equations.

In the above equations, $x_{ec}$, $y_{ec}$, $X_e$, and $y_e$ corresponds to data calculated for the right eye only or may correspond to data calculated for the left eye only. For example, if a wink is detected, $x_{ec}$, $y_{ec}$, $x_e$, and $y_e$ calculated from the open eye may be used. If both eyes are open, an average value of ($x_{ec}-x_e$) and ($y_{ec}-y_e$) for the left eye and right eye may be calculated and used to determine xs and ys in the above equations. A large difference in ($X_{ec}-X_e$) and ($y_{ec}-y_e$) for the right eye and left eye may signify an error in eye detection, resulting in the gaze mapping function 48 discarding the data determined for the current frame in the previous steps. The mouse cursor may remain unchanged from the previous frame if a blink is detected.

Additionally, if both eyes are detected, the distance between the left eye and right eye may be used to calculate a change in distance of the user from the display. The change in distance of the user from the display may be used to modify the ratio values in order to account for the change in distance of the user from the display.

The gaze mapping function 48 also performs mouse clicks based on the results of the blink/wink detection performed by the eye detection function 46. The detection of a right eye wink, left eye wink, or blink corresponds to different mouse clicks. For example, a left eye wink initiates a left mouse click, a right eye wink initiates a right mouse click, and a blink initiates a double left mouse click by the gaze mapping function 48. Conversely, the mouse click assigned to a particular eye wink or blink may also be set by the user.

Additionally, a sleep instruction can be initiated to put the computer device 10 into sleep mode if an extended blink is detected. An extended blink may comprise a blink that lasts, for example, greater than 120 frames, or other suitable number of frames.

A right eye wink, left eye wink, or blink is determined based on the left eye wink Boolean, right eye wink Boolean, and blink Boolean. The blink counter corresponds to the number of consecutive frames that a blink (closing of both eyes) is detected. The left eye and right eye wink Boolean corresponds to the number of consecutive frames that the left eye and right eye are closed respectively.

A double left mouse click is initiated in step 244 if the blink counter returned by the eye detection function 46 is greater than a blink threshold in step 242. The blink threshold may be, for example, 5 frames, 10 frames, 15 frames, or any suitable number of frames. In another embodiment, the blink threshold may be set by the user.

If the blink counter is not greater than or equal to the blink threshold in step 242, the left eye wink counter is compared to the wink threshold 246. If the left eye wink counter is greater than or equal to the wink threshold 246, a left mouse click 248 is initiated. The wink threshold may be, for example, 5 frames, 10 frames, 15 frames, or any suitable number of frames. In another embodiment, the wink threshold may be set by the user.

If the left eye wink counter is not greater than the wink threshold in step 246, the right eye wink counter is compared to the wink threshold in step 250. If the right eye wink counter is greater than or equal to the wink threshold in step 250, a right mouse click is initiated in step 252.

The eye detection function 46 is closed if the right eye wink counter is less than the wink threshold in step 250, or following the initiation of a double left mouse click in step 244, left mouse click in step 248, or right mouse click in step 252.

Following execution of the gaze mapping function 48, the current frame is incremented to the next frame in the image sequence in step 112 and processing is repeated.

Although certain embodiments have been shown and described, it is understood that equivalents and modifications falling within the scope of the appended claims will occur to others who are skilled in the art upon the reading and understanding of this specification.

What is claimed is:

1. A computer device comprising an eye-controlled computer mouse interface system, the computer device comprising:
   a camera or multiple cameras;
   a display; a memory;
   a processor programmed to execute a program comprising the eye-controlled computer mouse interface system, wherein the eye-controlled computer mouse interface system comprises a data acquisition function, a calibration function, an eye detection function, a face detection function, and a gaze mapping function;
   wherein the data acquisition function is configured to:
   acquire data in the form of at least one of individual images, stored video, live streaming video, or live streaming video from multiple cameras, wherein the acquired data is stored as a sequence of images, and individual images in the sequence of images are referred to as frames; and
   set a current frame in the image sequence, wherein a first frame in the image sequence is set as the current image;
   wherein the calibration function is configured to:
   display a target in a range of selected positions on the display, wherein the user follows the target on the display;
   initiate the eye detection function to determine a pupil center and eye center for each target position;
   determine ratio values using the pupil center, eye center, and target position for each of the target positions, wherein the ratio values are used to map movement of a user's eyes to the corresponding movement of a mouse cursor on the display; and store the ratio values in the memory;
   wherein the face detection function is configured to:
   detect a face in each frame of the sequence of images;
   extract the detected face; store the extracted frame in the memory; and
   end processing of the current frame if the user's face is not detected;
   wherein the eye detection function is configured to:
   retrieve the extracted face;
   localize and extract an eye region encompassing both of the user's eyes from the extracted face;
   split the eye region into a right eye region and a left eye region;
   determine for each eye region the eye center and the pupil center;
   store the eye center and pupil center for each eye region in the memory; and
   detect a left eye wink, a right eye wink, or a blink, wherein the left eye wink is a closing of the left eye while the right eye remains open, the right eye wink is a closing of the right eye while the left eye remains open, and the blink is a closing of both the left eye and right eye;
   wherein the gaze mapping function is configured to:
   map movement of the user's eyes to movement of the mouse cursor on the display using the eye center and pupil center for each eye region retrieved from the memory and the ratio values retrieved from the memory;
   perform a left mouse click when the left eye wink has been detected for a number of frames greater than or equal to a wink threshold;
   perform a right mouse click when the right eye wink has been detected for a number of frames greater than or equal to the wink threshold; and
   perform a double left mouse click when the blink has been detected for a number of frames greater than or equal to a blink threshold.

2. The system of claim 1, the gaze mapping function further configured to:
   utilize a four or eight direction algorithm to map movement of the user's eyes to movement of the mouse cursor on the display.

3. The system of claim 1, wherein the calibration function is further configured to:
   determine if the user is a new user or if the ratio values were previously determined for the user and stored in the memory; and retrieve the ratio values if the ratio values were previously determined for the user and stored in the memory or determine the ratio values for the new user.

4. The system of claim 1, the eye detection function further comprising tracking eye regions in the current frame when the eye regions were detected in the previous frame, wherein tracking comprises predicting the location of the eye in the current frame using the eye center in the previous frame.

5. The system of claim 1, wherein the eye detection function uses a point distribution model of the face.

6. The system of claim 5, wherein the eye detection function detects a blink or wink by fitting a straight line to corners of the eye and top and bottom of the eyelids as determined by the point distribution model of the face, wherein the wink or blink is detected if the line has an error less than an error threshold.

7. The system of claim 1, wherein the gaze mapping function is further configured to map movement of the mouse cursor based on the location of one eye and correct the mapping using the corresponding localization of the second eye.

8. The system of claim 1, wherein the right eye region and left eye region are used to perform a distance measurement of a user from the display and to compensate for movement of the user's head.

9. The system of claim 1, wherein the eye detection function localizes the eye by fitting an elliptical curve to the eye region.

10. The system of claim 1, wherein the system is further configured to continuously track the gaze of the user using live stream data.

11. The system of claim 1, wherein a sleep instruction is sent to the device for the device to enter a sleep mode if a blink is detected for a number of frames greater than or equal to a sleep threshold.

12. The system of claim 1, wherein the resolution of the device camera is 1.3 megapixels or greater.

13. A method for controlling an eye-controlled computer mouse interface, the method comprising:
    acquiring data in the form of at least one of individual images, stored video, live streaming video, or live streaming video from multiple cameras, wherein the acquired data is stored as a sequence of images, and individual images in the sequence of images are referred to as frames;
    setting a current frame in the image sequence, wherein a first frame in the image sequence is set as the current image;
    displaying a target in a range of selected positions on a display, wherein the user follows the target on the display;
    determining a pupil center and eye center for each target position;
    determining ratio values using the pupil center, eye center, and target position for each of the target positions, wherein the ratio values are used to map movement of a user's eyes to the corresponding movement of a mouse cursor on a display;
    storing the ratio values;
    detecting a face in each frame of the sequence of images;
    extracting the detected face;
    storing the extracted frame;
    ending processing of the current frame if the user's face is not detected;
    retrieving the extracted face;
    localizing and extracting an eye region encompassing both of the user's eyes from the extracted face;
    splitting the eye region into a right eye region and a left eye region;
    determining for each eye region the eye center and the pupil center;
    storing the eye center and pupil center for each eye region;
    detecting a left eye wink, a right eye wink, or a blink, wherein the left eye wink is a closing of the left eye while the right eye remains open, the right eye wink is a closing of the right eye while the left eye remains open, and the blink is a closing of both the left eye and right eye;
    mapping movement of the user's eyes to movement of the mouse cursor on the display using the retrieved eye center and pupil center for each eye region and the retrieved ratio values;
    performing a left mouse click when the left eye wink has been detected for a number of frames greater than or equal to a wink threshold;
    performing a right mouse click when the right eye wink has been detected for a number of frames greater than or equal to the wink threshold; and
    performing a double left mouse click when the blink has been detected for a number of frames greater than or equal to a blink threshold.

14. The method of claim 13, wherein the method further comprises:
    utilizing a four or eight direction algorithm to map movement of the user's eyes to movement of the mouse cursor on the display.

15. The method of claim 13, wherein the method further comprises:
    determining if the user is a new user or if the ratio values were previously determined for the user and stored; and
    retrieving the ratio values if the ratio values were previously determined for the user and stored or determine the ratio values for the new user.

16. The method of claim 13, wherein the method further comprises:
    tracking eye regions in the current frame when the eye regions were detected in the previous frame, wherein tracking comprises predicting the location of the eye in the current frame using the eye center in the previous frame.

17. The method of claim 13, wherein eye region localization is performed using a point distribution model of the face.

18. The method of claim 17, wherein the method detects a blink or wink by fitting a straight line to corners of the eye and top and bottom of the eyelids as determined by the point distribution model of the face, wherein the wink or blink is detected if the line has an error less than an error threshold.

19. The method of claim 13, wherein the method is further configured to map movement of the mouse cursor based on the location of one eye and correct the mapping using the corresponding localization of the second eye.

20. The method of claim 13, wherein the right eye region and left eye region are used to perform a distance measurement of a user from the display and to compensate for movement of the user's head.

21. The method of claim 13, wherein the method localizes the eye by fitting an elliptical curve to the eye region.

22. The method of claim 13, wherein the method is further configured to continuously track the gaze of the user using live stream data.

23. The method of claim 13, wherein the method further comprises sending a sleep instruction for a device to enter a sleep mode if a blink is detected for a number of frames greater than or equal to a sleep threshold.

24. A computer device comprising an eye-controlled computer mouse interface system, the computer device comprising:
- a camera or multiple cameras;
- a display;
- a memory;
- a processor programmed to execute a program comprising the eye-controlled computer mouse interface system, wherein the eye-controlled computer mouse interface system comprises a data acquisition function, a calibration function, an eye detection function, a face detection function, and a gaze mapping function;
- wherein the data acquisition function is configured to:
  - acquire data in the form of at least one of individual images, stored video, live streaming video, or live streaming video from multiple cameras, wherein the acquired data is stored as a sequence of images, and individual images in the sequence of images are referred to as frames; and
  - set a current frame in the image sequence, wherein a first frame in the image sequence is set as the current image;
- wherein the calibration function is configured to:
  - determine ratio values used to map movement of a user's eyes to the corresponding movement of a mouse cursor on the display; and
  - store the ratio values in the memory;
- wherein the face detection function is configured to:
  - detect a face in each frame of the sequence of images;
  - extract the detected face;
  - store the extracted frame in the memory; and
  - end processing of the current frame if the user's face is not detected;
- wherein the eye detection function is configured to:
  - retrieve the extracted face;
  - localize and extract an eye region encompassing both of the user's eyes from the extracted face;
  - split the eye region into a right eye region and a left eye region;
  - determine for each eye region an eye center and a pupil center;
  - store the eye center and pupil center for each eye region in the memory; and
  - detect a left eye wink, a right eye wink, or a blink, wherein the left eye wink is a closing of the left eye while the right eye remains open, the right eye wink is a closing of the right eye while the left eye remains open, and the blink is a closing of both the left eye and right eye;
- wherein the gaze mapping function is configured to:
  - map movement of the user's eyes to movement of the mouse cursor on the display using the eye center and pupil center for each eye region retrieved from the memory and the ratio values retrieved from the memory, wherein movement of the mouse cursor is mapped based on the location of one eye and the mapping is corrected using the corresponding localization of the second eye;
  - perform a left mouse click when the left eye wink has been detected for a number of frames greater than or equal to a wink threshold;
  - perform a right mouse click when the right eye wink has been detected for a number of frames greater than or equal to the wink threshold; and
  - perform a double left mouse click when the blink has been detected for a number of frames greater than or equal to a blink threshold.

\* \* \* \* \*